United States Patent [19]

Naarmann et al.

[11] Patent Number: 4,870,147

[45] Date of Patent: Sep. 26, 1989

[54] PROCESS FOR PRODUCING HIGHLY CONDUCTIVE POLYACETYLENE FILM

[75] Inventors: Herbert Naarmann, Wattenheim; Nicolas Theophilou, Ludwigshafen, both of Fed. Rep. of Germany

[73] Assignee: BASF Aktiengesellschaft, Ludwigshafen, Fed. Rep. of Germany

[21] Appl. No.: 50,564

[22] Filed: May 18, 1987

[30] Foreign Application Priority Data

May 24, 1986 [DE] Fed. Rep. of Germany ....... 3617505

[51] Int. Cl.$^4$ ...................... C08F 138/02; B29C 55/00
[52] U.S. Cl. ................................ 526/285; 526/348.1; 264/164; 264/344; 252/500
[58] Field of Search ............................ 526/348.1, 285; 264/104, 164, 291, 344; 252/500

[56] References Cited

U.S. PATENT DOCUMENTS

| | | | |
|---|---|---|---|
| 4,410,640 | 10/1983 | Kobayashi et al. | 526/285 X |
| 4,579,921 | 4/1986 | Gouarderes et al. | 526/285 X |
| 4,600,756 | 7/1986 | Pedretti et al. | 526/285 X |

FOREIGN PATENT DOCUMENTS 0088301 9/1983 European Pat. Off. ............ 526/285

OTHER PUBLICATIONS

Shirakawa, Anisotropic Electrical Conductivity of Partially Oriented Polyacetylene, J. Polym. Sci. Polym. Lett. Ed. 17, (1979), 195–201.
Ito et al., Simultaneous Polymerization and Formation of Polyacetylene Film on Surface of Concentrated Soluble Ziegler Type Catalyst Solution, J. Polym. Sci. Polym. Chem. Ed. 12, (1974), 11–20.
Journal of Polymer Science, vol. 12, 11–20, (1974), pp. 11–20.
Journal of Polymer Science, Polymer Letters Edition, vol. 17, 195–201, (1979), pp. 195–201.

Primary Examiner—Joseph L. Schofer
Assistant Examiner—F. M. Teskin
Attorney, Agent, or Firm—Oblon, Spivak, McClelland, Maier & Neustadt

[57] ABSTRACT

A highly conductive polyacetylene film is obtained by orienting a catalyst-containing polyacetylene film or an essentially catalyst-free polyacetylene film which has been swelled in a solvent after the catalyst has been washed out, the polyacetylene being essentially free of $sp^3$-hybridized carbon atoms.

1 Claim, No Drawings

PROCESS FOR PRODUCING HIGHLY CONDUCTIVE POLYACETYLENE FILM

The present invention relates to a highly conductive polyacetylene film which is obtainable by orienting catalyst-containing polyacetylene film or essentially catalyst-free polyacetylene film which has been swelled in a solvent after the catalyst has been washed out, wherein the polyacetylene is essentially free of $sp^3$-hybridized carbon atoms.

The present invention furthermore relates to a process for the production of a highly conductive polyacetylene film by orienting a polyacetylene film.

Shirakawa has disclosed that the polymerization of acetylene over Ziegler catalysts can give mechanically strong films of polyacetylene (cf. J. Polym. Sci. Polym. Chem. Ed., 12 (1974), 11–20). Particularly at fairly high catalyst concentrations polyacetylene films having an adequate mechanical strength are formed (cf. also German Laid-Open Application DOS No.3,120,441).

Shirakawa furthermore states, in J. Polym. Sci. Polym. Lett. Ed. 17 (1979), 195–201, that films produced by the Shirakawa method can be oriented, a certain degree of orientation and anisotropy of the electrical conductivity being observed. However, no information is given regarding the condition$ of orientation, and the conductivities achieved are still too low for many applications.

EP-A-No. 88 301 describes a process for the production of polyacetylene films which have better electrical conductivity and better mechanical properties than the Shirakawa films. However, the electrical conductivity of these films too is still inadequate for some intended uses.

It is an object of the present invention to provide a highly conductive polyacetylene film which has not only high electrical conductivity but also good mechanical properties.

We have found that this object is achieved, according to the invention, by a highly conductive polyacetylene film which is obtainable by orienting a catalyst-containing or essentially catalyst-free swollen polyacetylene film which is essentially free of $sp^3$-hybridized carbon atoms.

The novel highly conductive polyacetylene film is obtainable by orienting a polyacetylene film which still contains catalyst or which is swelled in a suitable solvent after the catalyst has been washed out.

During orientation of the catalyst-containing films, stretching rates of up to 300% are achieved; swollen, essentially catalyst-free polyacetylene films can even be oriented at stretching rates up to 600%. The stretching rates here relate to the additional longitudinal extension as a result of orientation, i.e. a stretching rate of 100% corresponds to a doubling of the linear dimension of the polyacetylene film in the stretching direction.

After orientation, the novel highly conductive polyacetylene films obtained can be further processed in a conventional manner.

Catalyst-containing films are washed with a suitable solvent and thus freed from the catalyst, and then doped by a conventional method. Where catalyst-free films are subjected to orientation, the washing step is dispensed with and doping can then be carried out directly.

It should be pointed out once again that catalyst-free polyacetylene films have to be swelled in a suitable solvent after the catalyst has been washed out. Washed polyacetylene films which have not been subjected to this treatment have poorer mechanical properties and therefore cannot be oriented to the same extent. Preferably, swelling is carried out directly after the catalyst has been washed out.

The swelling time of the washed polyacetylene films is in general from 2 to 100, preferably from 6 to 50, in particular from 12 to 48, hours.

Only toluene and benzene are mentioned here as solvents for swelling.

As stated above, in order to achieve the extremely high electrical conductivities of the novel polyacetylene films, the polyacetylene films used in the orientation procedure must be essentially free of $sp^3$-hybridized carbon atoms. Preferably used films are those which contain less than 0.5 mol %, based on the total content of carbon atoms in the polyacetylene, of $sp^3$-hybridized carbon atoms. A higher content of $sp^3$-hybridized carbon atoms results in a lower electrical conductivity in the initial films themselves and consequently the electrical conductivities obtainable after orientation are also smaller than in the case of films having a low content of $sp^3$-hybridized carbon atoms. $sp^3$-hybridized carbon atoms are carbon atoms which have 4 single bonds at an angle of about 109.5° to one another.

Films which meet the above preconditions are obtained, for example, by the process described in EP-A-88 301. Further details of the preparation process may be obtained from this publication.

The conductivities of these films after washing out of the catalyst and doping with the conventional dopants is in general from 200 to 2000 s/cm, and the specific gravity is from 0.6 to 0.8, preferably from 0.65 to 0.75, g/cm$^3$. In these two properties, the films obtained as described in EP-A-No. 88 301 differ substantially from the conventional films obtained by the Shirakawa process.

In one version of the orientation process, the polyacetylene films obtained after production in an inert atmosphere (for example under nitrogen or argon) are oriented directly after the polymerization, without an intermediate step, if necessary together with the base to which they are applied. As stated above, this makes it possible to achieve stretching rates of up to 300%, preferably from 100 to 250%, in particular from 150 to 250%.

When orientation is complete, the films are washed in a conventional manner, i.e. the catalyst is removed, and are then doped with the conventional dopants. Methods of doping and dopants are described in, for example EP-A-No. 36 118, so that further information is unnecessary here.

In every case, it is advantageous to store the oriented and doped films in the absence of atmospheric oxygen, since the conductivity is adversely affected by oxygen and moisture.

In the case of the oriented catalyst-containing films, the conductivities achievable after doping, for example with saturated iodine solution, are up to 15,000 S/cm, depending on the stretching rate. The electrical conductivity is found to increase steadily with increasing stretching rate.

At stretching rates of about 200%, orientation of catalyst-containing films produced according to EP-A-No. 88 301 gives electrical conductivities of from 8,000 to 11,000, in particular from 8,500 to 10,000 S/cm.

Simultaneously with the sharp increase in the electrical conductivity in the stretching or orientation direction, a decrease in the electrical conductivity at right angles to the orientation direction is observed, i.e. the electrical conductivity becomes more anisotropic.

The anisotropy factor, i.e. the ratio of electrical conductivity in the orientation direction to that at right angles to this direction, likewise increases with increasing degree of stretching and generally reaches from 3 to 50, in particular from 5 to 40.

Because of the even higher stretching rates possible (up to 600%), orientation of essentially catalyst-free, swollen polyacetylene films gives even higher conductivities. At stretching rates of 150–550%, the electrical conductivities after doping are generally from 2,500 to 11,000 S/cm (measured as the specific electrical conductivity [S/cm]).

As in the case of orientation of the catalyst-containing films, the electrical conductivity and the anisotropy of the electrical conductivity are found to increase with increasing stretching rate.

The anisotropy factors reach values of the same order of magnitude as for orientation of catalyst-containing polyacetylene films.

In the case of stretching of polyacetylene films on a base, the achievable stretching rates are generally lower than in the orientation of polyacetylene films alone, owing to the restrictive mechanical properties of the base. The stretching rates are of course dependent on the type of base used and reach values of more than 500%.

Orientation can, very generally, be carried out at from 0° to 200° C., in particular from 15° to 150° C. Because of the stated adverse effect of moisture and oxygen, orientation should be carried out under an inert atmosphere, for example under nitrogen or argon.

In practice, a polyacetylene film to be oriented is clamped at one end and stretched continuously at the other end in one direction, using an appropriate drawing apparatus.

Because of their extremely high electrical conductivities, the novel highly conductive polyacetylene films are particularly useful for the production of highly efficient electrodes and of materials for shielding against electromagnetic waves, and for sensors very generally.

Because of the low specific gravity of the polyacetylene films, the conductivities of about 10,000 S/cm exhibited by the novel highly conductive polyacetylene films, based on volume, are higher than those of many metals, and only lower than the value for copper. Consequently, possible applications include those in which the novel polyacetylene films may replace metals as far as the electrical conductivity is concerned.

All work in the Examples below was carried out under an inert atmosphere.

EXAMPLE 1

A catalyst system was prepared at 40° C. under an argon atmosphere by dropwise addition of 0.24 mole of triethylaluminum to a vigorously stirred solution of 0.12 mole of tetrabutoxytitanium in 50 ml of silicone oil (AV 1000 ®, registered trade mark of Wacker-Chemie).

This solution was applied to a polyester base, after which gaseous acetylene (purity > 99%) was applied and polymerized, these steps being carried out under an inert atmosphere. After polymerization had been carried out for 7 minutes, the resulting 35 μm thick film was removed from the polyester, oriented and then washed until it was catalyst-free.

The subsequent doping was carried out using saturated iodine/$CCl_4$ solution. The film to be doped was stored for 1 hour at room temperature in the saturated iodine solution in the absence of air and light. The film doped in this manner was washed three times with $CCl_4$ and dried for 20 minutes at 30° C. and 0.1 mbar under argon.

The increase in the electrical conductivity in the orientation direction, the corresponding decrease at right angles to this direction and the anisotropy factors, i.e. the ratio of electrical conductivity in the orientation direction to that at right angles to this direction, are shown in the Table.

TABLE

| Stretching rate | 0% | 100% | 120% | 140% | 200% | 250% |
|---|---|---|---|---|---|---|
| Electrical conductivity in orientation direction S/cm | 1850 | 4350 | 5050 | 8600 | 9740 | 10800 |
| Electrical conductivity at right angles to the orientation direction S/cm | 1850 | 780 | 560 | 400 | 350 | 300 |
| Anisotropy factor | 1.0 | 6.3 | 9.0 | 21.5 | 27.8 | 36.0 |

EXAMPLE 2

The procedure described in Example 1 was followed, except that a 10 μm thick polyethylene film was used instead of the polyester and the polymerization time was only 3 minutes instead of 7 minutes. The polyacetylene film adhered firmly to the polyethylene film.

(a) The catalyst-moist polyacetylene film was oriented together with the base film, after which the catalyst was washed out and the polyacetylene film was doped on the polyethylene film under the same conditions as in Example 1.

At a stretching rate of 200%, an electrical conductivity of 2,900 S/cm was obtained.

(b) The polyacetylene film was washed with HCl-containing methanol, stored for 10 hours in toluene (at room temperature in an excess of solvent) to effect swelling and then oriented. After doping (as in Example 1), the electrical conductivity at a stretching rate of 550% was 7,900 S/cm.

We claim:

1. A process for the production of a highly conductive polyacetylene film by orienting a polyacetylene film, wherein an essentially catalyst-free polyacetylene film which has been swollen in a solvent after the catalyst has been washed out is oriented at stretching rates up to 600%, and wherein the content of $sp^3$-hybridized carbon atoms in the polyacetylene is less than 0.5 mol %, based on the total carbon content of the polyacetylene.

* * * * *